Figure 1:
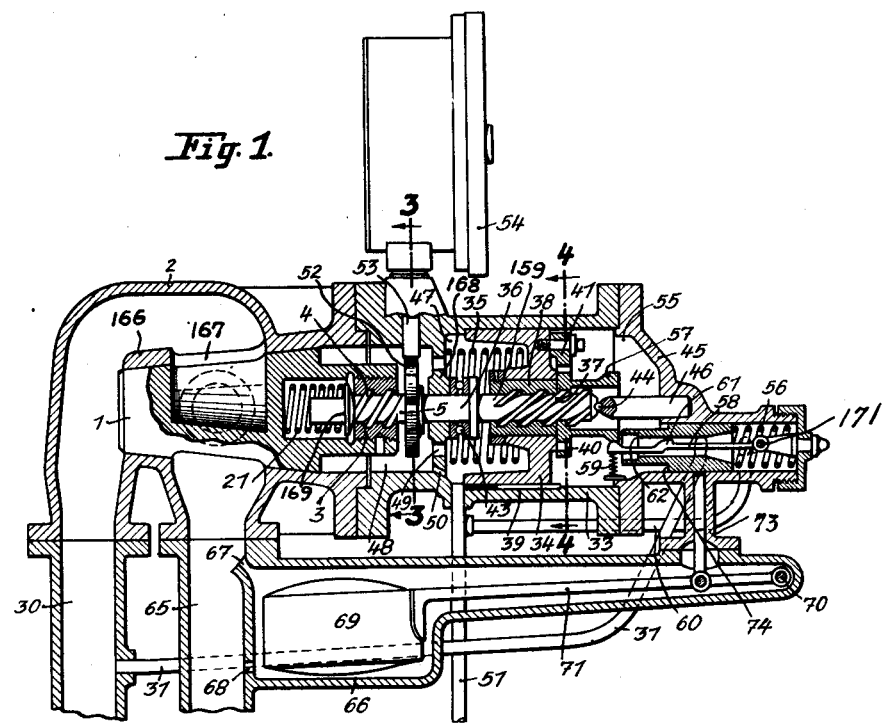

Nov. 13, 1928.

E. HURLBRINK 1,691,070

APPARATUS FOR DISPENSING LIQUIDS

Filed June 9, 1927  4 Sheets-Sheet 1

Inventor:
Ernst Hurlbrink
by:
Lorka, Kehlenbeck & Farley
Attorneys

Nov. 13, 1928.
E. HURLBRINK
1,691,070
APPARATUS FOR DISPENSING LIQUIDS
Filed June 9, 1927      4 Sheets-Sheet 2
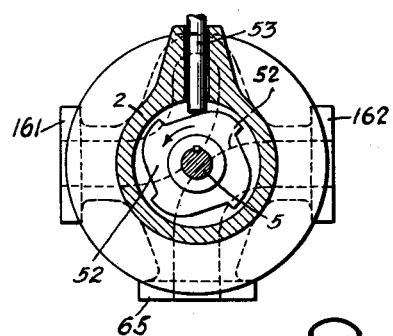
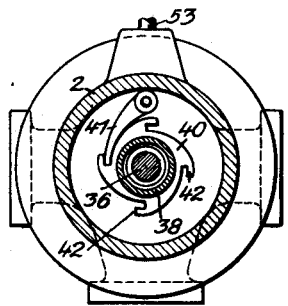
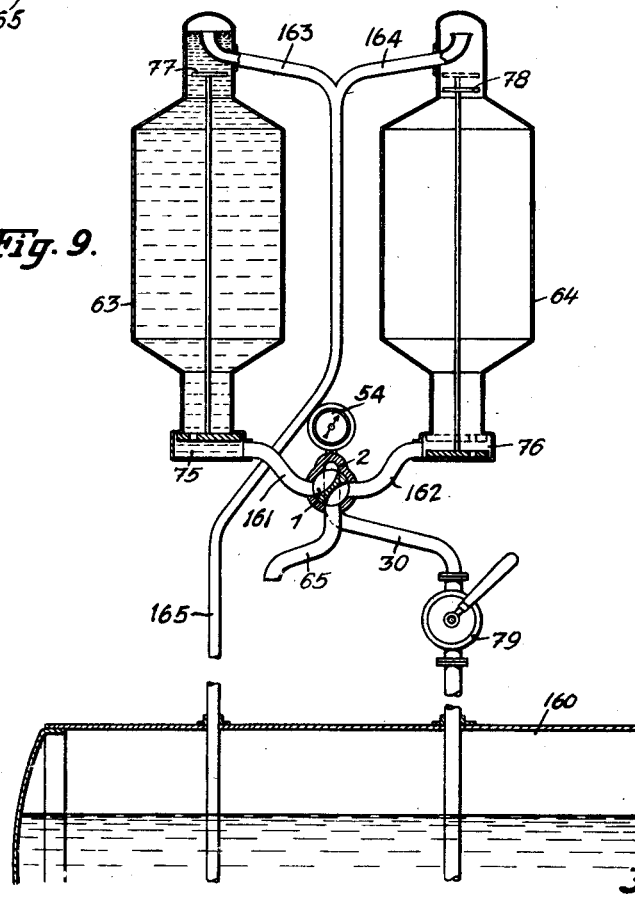
Inventor:
Ernst Hurlbrink
by:
Lotka, Kehlenbeck & Farley
Attorneys Nov. 13, 1928.  1,691,070
E. HURLBRINK
APPARATUS FOR DISPENSING LIQUIDS
Filed June 9, 1927   4 Sheets-Sheet 3
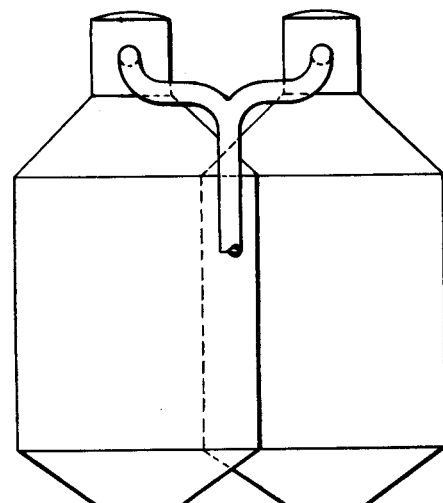
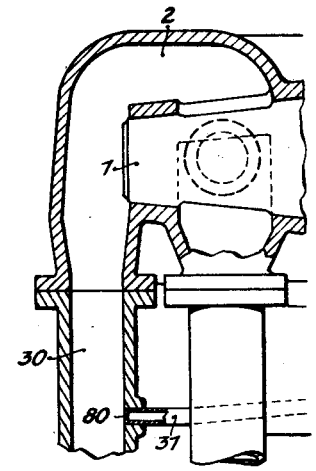
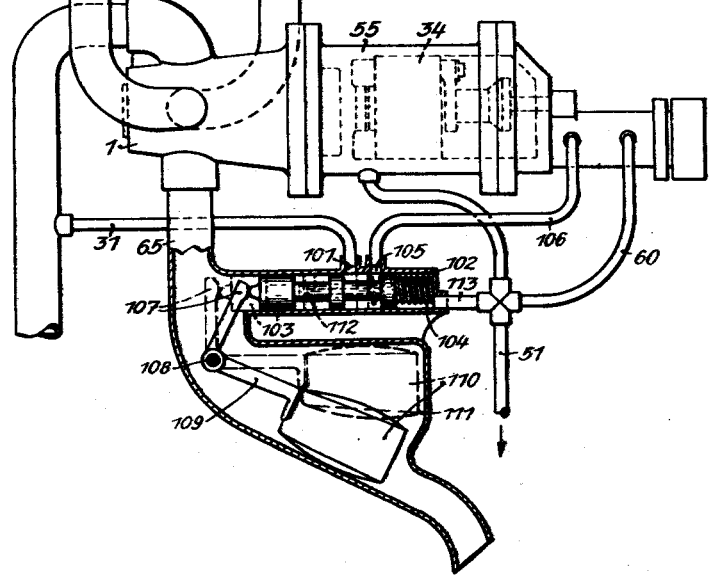
Inventor:
Ernst Hurlbrink
by: Larka, Kehlenbeck & Farley
Attorneys Nov. 13, 1928.                                                    1,691,070
                           E. HURLBRINK
                   APPARATUS FOR DISPENSING LIQUIDS
                      Filed June 9, 1927          4 Sheets-Sheet 4
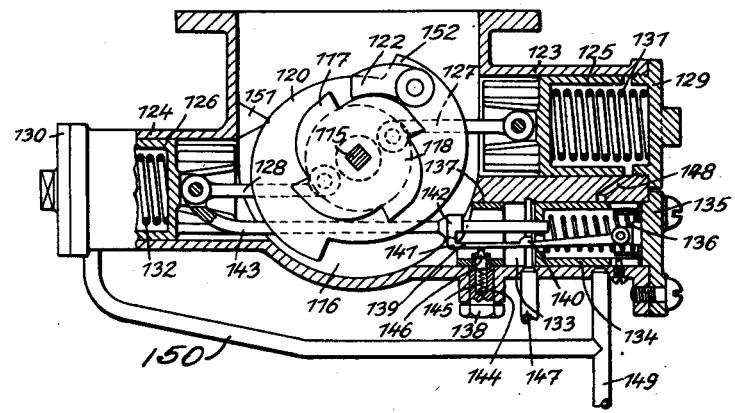
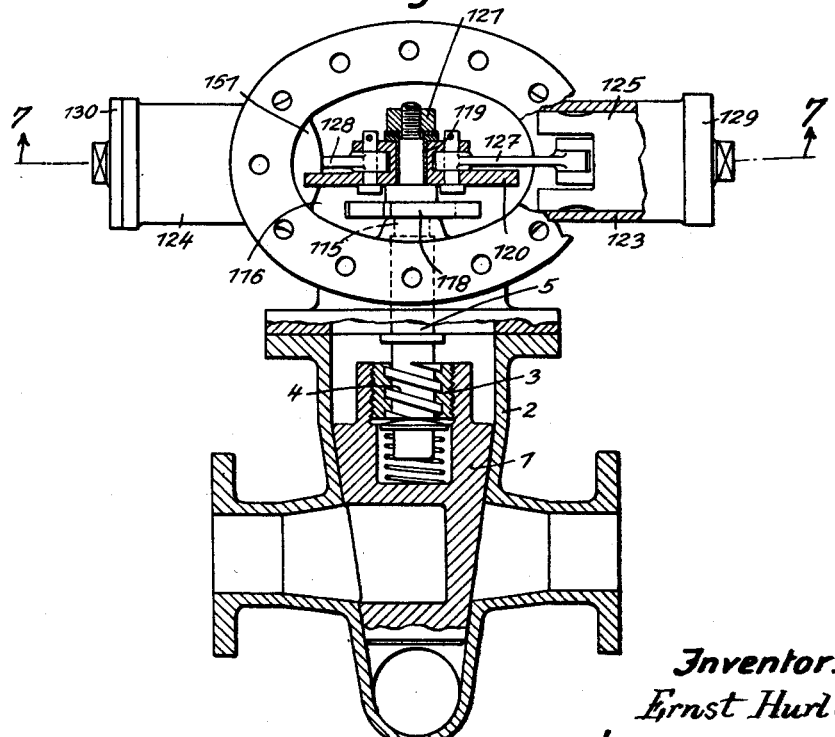
Inventor:
Ernst Hurlbrink
by:
Louis, Kehlenberk & Farley
Attorneys Patented Nov. 13, 1928.

1,691,070

UNITED STATES PATENT OFFICE.

ERNST HURLBRINK, OF BERLIN, GERMANY, ASSIGNOR TO MARTINI & HUNEKE MASCHINENBAU AKTIEN-GESELLSCHAFT, OF BERLIN, GERMANY, A CORPORATION OF GERMANY.

APPARATUS FOR DISPENSING LIQUIDS.

Application filed June 9, 1927, Serial No. 197,541, and in Germany September 25, 1925.

My invention relates to improvements in apparatus for dispensing liquids, and more particularly in apparatus of the type in which the liquid is supplied, by means of fluid pressure, from a container to one or more measuring vessels, and in which a valve or cock is used which is actuated automatically after filling and emptying the vessel. One of the objects of the improvements is to provide an apparatus of this type in which the valve or cock is operated so that after filling the measuring vessel there is sufficient time for the bubbles to rise to the surface of the liquid, before the supply of liquid to the measuring vessel is actually interrupted. In apparatus of the class referred to the valve controlling the supply of the liquid from the container to the measuring vessel is automatically operated by the back pressure on the liquid produced after filling the measuring vessel, the said back pressure being used for actuating a valve operating device. Now, for retarding the operation of the valve, the valve actuating apparatus is constructed so as to lag behind the impulse imparted thereto by the said back pressure. In the preferred construction the valve operating apparatus includes power storing means adapted to be operated when the measuring vessel has been filled, and to deliver the power to the valve operating apparatus a suitable period of time after having the power stored therein.

Other objects of the improvements will appear from the following description of the invention.

For the purpose of explaining the invention several examples embodying the same have been shown in the accompanying drawings in which the same reference characters have been used in all the views to indicate corresponding parts. In said drawings, Fig. 1, is a sectional elevation showing the valve and the operating apparatus therefor, the valve operating apparatus being shown in the position in which power has been stored therein for operating the valve, Fig. 2, is a similar sectional elevation showing the valve operating apparatus in the position in which the valve operating apparatus has delivered its power to the valve for turning the same, Fig. 3, is a sectional elevation taken on the line 3—3 of Fig. 1, Fig. 4, is a sectional elevation taken on the line 4—4 of Fig. 1, Fig. 5, is a detail sectional view showing a modification, Fig. 6, is an elevation partly in section showing the valve, its operating mechanism, the measuring vessels, and means for controlling the supply of pressure fluid to the valve operating mechanism, the apparatus illustrated in the said figure being another modification of the apparatus shown in Figs. 1 to 4, Fig. 7, is a sectional elevation taken on the line 7—7 of Fig. 8, and showing another modification, Fig. 8, is a plan view of Fig. 7 partly in section, and Fig. 9, is a diagrammatical elevation, showing the container for the liquid, the measuring vessels, and the valve controlling the supply of liquid to the said vessels.

The general arrangement of the apparatus will be best understood from Fig. 9. As shown in the said figure, the apparatus comprises a container 160 for a suitable liquid, such for example as benzine, two measuring vessels 63 and 64, a valve 1 controlling the supply of the liquid from the container 160 to the measuring vessels 63 and 64 and the delivery of the liquid from the said vessels, pipes 161 and 162 connecting the valve casing 2 with the vessels 63 and 64, a pipe 30 including a pump 79 and connected with the container 160 for supplying the liquid to the valve 1 and the vessels 63, 64, a pipe 65 connected with the bottom part of the valve for delivering the measured liquid from the receptacles 63 and 64, and a registering apparatus 54 adapted to register the number of the operations of the valve 1 and thereby the amount of the liquid dispensed from the container 160.

Figure 2:
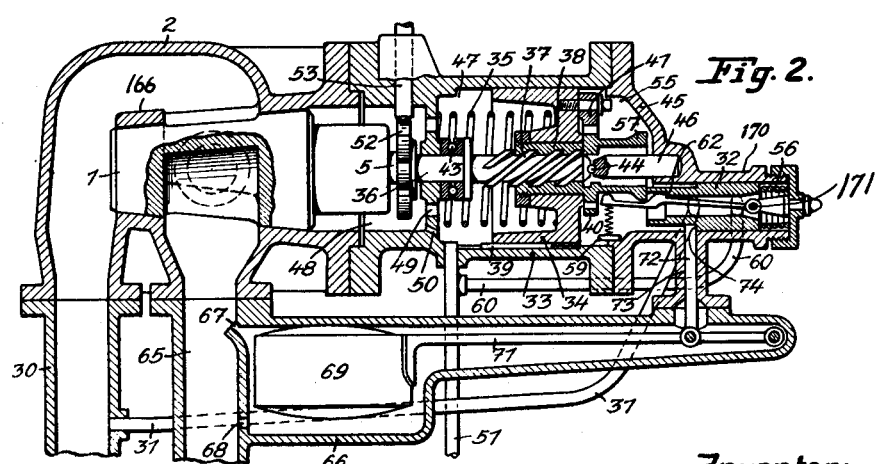

Figs. 1 and 2 show that the supply pipe 30 is connected to the top part of the valve casing 2, so that, in the position of the parts shown in Fig. 9, it communicates through the valve with the vessel 63, and that the delivery pipe 65 communicates with the vessel 64. At the top parts of the measuring vessels 63 and 64 there are overflows 163 and 164, which communicate with the container 160 through a pipe 165. In Fig. 9 I have shown an example in which two measuring vessels 63 and 64 are provided, which are alternately operated for receiving the liquid supplied thereto from the container 160 and for delivering the same through the pipe 65. But I wish it to be understood that my invention is not limited to an apparatus comprising a plurality of alternately operated measuring vessels, and that it equally applies to apparatus comprising a single measuring vessel.

In describing the construction of the valve and its operating mechanism I shall at first make reference to those parts which are needed for operating a valve forming a part of a system comprising a single measuring vessel, and thereafter, I shall describe those parts, which are provided in a system comprising two measuring vessels.

The valve and its operating mechanism has been shown in detail in Figs. 1 to 4. As shown, the plug 1 of the valve is disposed within a valve seat 166 provided within the casing 2, and it comprises a passage 167 adapted to connect the pipe 161 and the measuring vessel 63 alternately with the supply pipe 30 and with the delivery pipe 65, the plug being shown in Figs. 1 and 3 in the position in which the said passage connects the supply pipe 30 with the pipe 161, while Fig. 2 shows the plug in the position in which the pipe 161 is connected with the delivery pipe 65. A cross section of the valve plug 1 through its valve ports will have an appearance very similar to the cross sectional view of the plug as seen in Fig. 9. To the casing 2 a cylinder 33 is secured which is in axial alignment with the seat 166 and the plug 1, the casing 2 being closed at its right hand end by a head 45. The plug 1 is adapted to be rotated by means of a spindle 159 comprising a portion 5 and a portion 36, the portion 36 being mounted in a partition 168 of the cylinder 33, and being supported at its rear end on a short rod 46 disposed in a socket of the head 45, a ball 44 being preferably interposed between spherical recesses formed in the adjacent ends of the spindle 159 and the rod 46. Further, the part 36 of the spindle is restrained from axial movement by an antifriction bearing 43. The left hand end of the spindle 159 bears on a disk 169 providing a bearing for a coiled spring 21 acting on the plug 1 and tending to force the same into its seat. The portion 5 of the spindle is formed with screw threads 4 engaging in an internally screw-threaded plug 3 fixed to the plug 1. Thus, when rocking the spindle 159 in the manner to be described hereafter for turning the plug 1, the plug is first slightly lifted from its seat by the screw threads 4, in order to loosen the plug slightly before turning it.

The mechanism for rocking the spindle 159 is constructed as follows:

Within the cylinder 33 a plunger 34 has reciprocating movement which is secured as against rotary movement by means of a feather 39, engaging in a groove of the plunger, and in an axial bore of the plunger a sleeve 38 is rotatable, which is formed with very steep internal screw threads engaging corresponding screw threads 37 formed on the portion 36 of the spindle. The sleeve 38 is made integral with or secured to a collar 40 formed with four ratchet teeth, arranged for engagement with a pawl 41 rockingly mounted on the plunger 34. The plunger is acted upon by a powerful spring 35 supported on the partition 168 and adapted to store the power transmitted to the plunger in the manner to be described hereafter. When the plunger is moved inwardly or to the left in Fig. 1 for compressing the spring 35 and storing power therein the sleeve 38 will rotate within the plunger and will screw inwardly on the screw threads 37 of the spindle 159, the pawl 41 riding on the ratchet teeth of the collar 40. But when the plunger is pushed back by the spring 35 and into the position shown in Fig. 2 the pawl engages one of the ratchet teeth and prevents rotation of the sleeve. Therefore, the rectilinear return movement of the plunger is transformed into rotary movement of the spindle 159 and the plug 1. As appears from Fig. 4, the ratchet teeth are formed with noses 42, so that the pawl can engage one of the teeth only after rotation through an angle of more than 90°. The result is that at the beginning of the expansion of the spring the pawl imparts a sharp thrust for loosening the plug. Further, at the beginning of the rotary movement of the spindle 159, the screw threads 4 are screwed into plug 3, thus slightly unseating the plug 1 before turning the same. The spindle 159 carries a cam 52 having four rises, in contact with a rod 53 for actuating a counter 54. The plunger 34 is forced inwardly by liquid pressure transmitted to the cylinder 33 from the supply pipe 30 through a pipe 31, and for controlling the supply of liquid to the right hand part of the cylinder 33 a tubular slide valve 32 is disposed in a cylinder 170 made integral with the head 45 and opening into the cylinder 33. The slide valve 32 is acted upon by a spring 56 thrusting it one way, and by a tubular boss 57 on the sleeve 38 thrusting it the other way. In the retracted position of the slide valve 32 the pipe 31 communicates with the cylinder 33, as is shown in Fig. 2, and in the said position the slide valve is locked by means of a pawl 58 pivoted at 171 and acted upon by a spring 59, a nose 61 of the said pawl engaging a shoulder 62 of the slide valve. At its outer end the boss 57 is formed with a collar adapted to engage the outer end of the pawl 58. Thus, when the plunger is shifted to the right and into the position shown in Fig. 2, the pawl locks the slide valve 32 in retracted position, but when the plunger is shifted to the left, the collar on boss 57 moves the pawl 58 downwardly so as to release the valve 32 and to permit the same to be shifted to the left and to the position shown in Fig. 1 by the spring 56 acting on the right hand end face thereof. When thereafter the plunger is thrown to the right by the spring 35 the end face of the boss 57 engages the slide valve 32 and returns the same into the retracted position shown in Fig. 2, the pawl 58 being thrown by a spring 59 into locking engagement with the shoulder 62.

The portion of the cylinder 33 located at the left of the plunger 34 is connected with a pipe 51 communicating with the pipe 165, and the said part of the cylinder is connected with the chamber 48 through ports 49 and 50 made in the partition wall 168, so that any liquid leaking past the plug 1 and the parts 37, 38 is allowed to escape through the pipe 51. A branch pipe 60 connected with the pipe 51 is connected with the cylinder 170, the said pipe communicating with the right hand part of the cylinder 33 through the tubular valve 32, and being adapted to be closed by the slide valve moving to the right and into the position shown in Fig. 2.

It will therefore be apparent that the pawl 58 is moved downwardly by the boss 57 only after the plunger 34 has arrived in its left hand end position, so that the valve 32 is released and thrown to the left for connecting the right hand part of the cylinder 33 with the pipe 60 and permitting the fluid contained therein to escape through the pipe 60, the fluid being forced therethrough by the return movement of the plunger 34 to the right, after the plunger has completed a full stroke.

The operation of the parts of the apparatus so far described is as follows:

It may be assumed that the cock 1 is in the position shown in Fig 2, and the liquid is being supplied from the container 160 by means of the pump 79 and through the pipe 30, the valve casing 2 and the pipe 161. After the measuring vessel 63 has been filled, back pressure is produced within the pipe 30 by means later to be described, which pressure is transmitted through the pipe 31 to the part of the cylinder 33 at the right of the plunger 34. Thereby the plunger is shifted to the left while compressing the spring 35, the sleeve 38 rotating within the plunger and screwing inwardly on the portion 36 of the spindle of the cock. At the end of the inward stroke of the plunger 34 the collar on the boss 57 engages the left hand end of the pawl 58 thus pressing the same downwardly and out of locking engagement with the slide valve 32, which is therefore thrown inwardly by the spring 56. Now the parts are in the positions shown in Fig. 1, the slide valve 32 closing the pipe 31 and laying open the inlet from the pipe 60 to the cylinder 30. Thus the fluid pressure within the cylinder 33 at the right of the plunger 34 is relieved, and the plunger 34 is forced outwardly by the spring 35. During the first part of the outward movement of the plunger the collar 40 is out of engagement with the pawl 41, so that the sleeve 38 is free to turn within the plunger, until the pawl 41 engages one of the ratchet teeth of the said collar thus locking the sleeve relatively to the plunger. Thus further outward movement of the plunger is transformed by means of the screw threads 37 into rotary movement of the spindle 159, and by the impact imparted by the plunger a a strong moment is imparted to the screw threads 4 of the spindle. Now, the screw threads 4 are at first screwed into the nut 3 thus slightly retracting the plug 1 from its seat, whereupon the plug takes part in the rotary movement of the spindle 159, so that it is turned at an angle of 90°, thus connecting the pipe 161 and the vessel 63 with the delivery pipe 65.

During the outward movement of the plunger 34 the tubular boss 57 engages the slide valve 32 and forces the same to the right and into the position shown in Fig. 2, in which the said slide valve is again locked by the pawl 58. Now the apparatus is again in position for another filling operation. In the example shown in the figures the liquid is now supplied to the second measuring vessel 64, the operation being the same as has been described above.

By connecting the left hand part of the cylinder 33 with the pipe 51 any liquid leaking into the said part through the ports 49 and 50 is passed back into the storage container, and the left hand part of the cylinder is always empty, so that the plunger can be moved to the left by the pressure transmitted thereto through the pipe 31. Further, it will be noted that the slide valve 32 is released from the pawl 61 only after the plunger has completed its inward stroke. Therefore, the said plunger can not return into initial position before completing a full stroke, because until the stroke is completed the liquid confined within the cylinder 33 can not escape through the pipe 60.

Within the measuring vessels 63 and 64 there are throttle valves 75, 76 at the inlets of the two vessels, each connected to a controlling member 77 or 78 at the top of the respective vessel. Normally, the said throttling members are in the inoperative position indicated in Fig. 9 by the member 76. But when the measuring vessel is nearly filled, the rising liquid strikes one of the controlling members, 77 for example, and the impact lifts throttling member 75. The members are then held in raised position by the restricted upward flow of liquid around member 77 and by the increased pressure on the lower side of the ported member 75. The resistance opposing the entry of the liquid into the measuring vessel causes this increase of pressure, so that a fairly high pressure is produced by the pump within the pipe 30 without imposing excessive pressure on the vessel. This gives the required back-pressure in pipe 30, which is transmitted through pipes 31 to actuate the plunger 34, and also curbs the violence of the flow into the measuring vessel, giving the bubbles time to rise. The spring return of the plunger to the right, as previously explained, rotates the valve 1 to permit the vessel to discharge its contents into pipe 65. It is readily seen that, when this occurs, the downward flow of liquid and the weight of members 75 and 77 will cooperate to cause said members to return to their lower position.

An additional device may be used for further retarding the actuation of the cock and increasing the time allowed for escape of bubbles from the liquid, this device being a throttle, for example a disk 80 (Fig. 5), disposed within the pipe 31 supplying liquid under pressure to the housing containing the plunger 34 or the like.

In describing the operation of the apparatus reference has been made to the cooperation of the valve with one measuring vessel. As appears from Fig. 9, the apparatus comprises two measuring vessels 63 and 64 which are alternately connected to the pump for being filled thereby, and to the delivery pipe 65 for delivering the liquid. The apparatus described above may be used in connection with the said two measuring vessels. But I prefer to provide a few additional devices controlling the alternative operation of both measuring vessels, and I shall now describe the said additional mechanisms.

In order to make the operation dependent on complete emptying of the vessels alternately, the discharge pipe 65 (Figs. 1 and 2) communicates by means of two ports 67, 68 with a float chamber 66, in which a float 69 is held raised while there is liquid in the pipe 65, but drops when the liquid has flowed out. The float lever 71, pivoted at 70 has pivoted to it a rod 72 working in a guide 73, and when the float is raised this rod engages a shoulder 74 on the valve 32 (Fig. 2), and prevents actuation thereof by the spring 56. The actuation of the cock is thus not only dependent on the filling of one vessel, but also on the emptying of the other.

With the mechanism described it may occur that when the plunger has compressed its spring the float does not release slide valve 32, the pump being stopped, and leakage past the valve allows the plunger to creep back. The cock might thus be actuated before the vessel connected to it is quite empty. A device now to be described prevents this.

In the modification shown in Fig. 6 the construction of the valve 1, 2 and its operating mechanism is the same as has been described with reference to Figs. 1 to 4, but the pipe 31 does not lead directly to the housing 55 containing the plunger 34, but to a port 101 in the wall of a cylinder 102 containing a balanced piston valve 103 acted on by a spring 104. To another port 105 is connected a pipe 106 leading to the housing 55. The piston valve is coupled with one arm 107 of a bell crank lever pivoted at 108, the other arm 109 carrying a float in a chamber 111 formed by an enlargement of the discharge pipe 65. The valve has a duct 112 open at one end to a space formed by an annular constriction of the valve, and at the other end to a cylinder space communicating by means of a pipe 113 with the discharge pipes 51 and 60. With the valve positioned as shown in Fig. 6 the pipe 31 is in communication with the pipe 106, so that the plunger 34 is under liquid pressure from the right. When the liquid being discharged through the pipe 65 lifts the float 110 the valve 103 moves to the position shown in broken lines and interrupts communication between the ports 101 and 105. Any liquid which has leaked into the annular chamber open to the duct 112 can flow through this duct to the pipes 113 and 51. The valve prevents the flow of liquid to the housing 55 till the float 110 drops and causes the valve to return to the position shown in full lines.

In Figs. 7 and 8 I have illustrated a modification of the cock which can be manufactured at comparatively low cost, and which is particularly reliable in operation.

The end portion 115 of the spindle 5 is within a chamber 116, and has fixed to it a ratchet wheel 118 with four teeth 117. It also carries a sleeve 119 with a balance weight 120, retained by a nut 121. To the balance weight is pivoted a pawl 122 engaging the ratchet wheel. Two cylinders 123, 124 are joined to the chamber 116, and contain plungers 125, 126 connected by links 127, 128 to the balance weight, and the plungers are acted on by springs 131, 132 seated against the cylinder heads 129, 130. Another cylinder 133 connected to the chamber 116 contains a piston valve 134 acted on by a spring 136 seated against the cylinder head 135. A ring 137 limits the movement of the piston valve under the action of the spring, the ring being fixed by means of a set screw 138. To the cylinder head 135 is pivoted a pawl 139 with two noses 140, 141. The nose 140 retains the valve in the position shown in Fig. 7 till the pawl is depressed by a projection 142 on a rod 143 connected to the plunger 126. Depression of the pawl compresses a spring 145 in a cavity 144 in the screw 138, a small plunger 146 being interposed between this spring and the pawl.

A pipe 147 is connected to the cylinder 133 at a port which is open when the valve 134 is locked by the pawl, and a duct 148 connects the cylinder 133 to the chamber between the plunger 125 and the cylinder head 129. The cylinder 133 is also connected to a discharge pipe 149, which is connected by a pipe 150 to the space between the plunger 126 and the cylinder head 130.

Within the chamber 116 there is an abutment 151 in the path of a nose 152 on the balance weight 120, but this weight rotates through a larger angle (say 120°) than the ratchet wheel, and the pawl 122 does not engage the teeth of the ratchet wheel till the balance weight has acquired some momentum, which assists in overcoming the initial friction of the plug 1 in its housing 2.

During the pumping of the liquid the valve 134 is positioned as shown in Fig. 7, and liquid under pressure can enter the chamber 116 through the pipe 147, forcing the plungers 125 and 126 outwards, as shown, so that the balance weight is rotated to place the pawl 122 some distance behind the face of one of the ratchet teeth 117. When the two plungers have completed their outward strokes the rod 143 depresses the pawl 139, and the valve 134 moves into contact with the ring 137, closing the pipe 147 and opening the pipe 149 and duct 148, so that any liquid which has leaked past the valve and the plungers 125, 126 can escape, and also the liquid from the chamber 116, so that the plungers 125, 126 are moved inwardly by their springs, rotating the balance weight and causing the pawl 122 to impart rotation to the spindle 5 and plug 1, the rotation of the plug being through 90°, as in the example shown the ratchet wheel has four teeth.

During the inward movement of the plunger 126 the nose 142 on the rod 143 pushes the valve 134 to the position shown in Fig. 7, in which the valve is then retained by the pawl 139, so that the action described can be repeated.

While in describing the invention reference has been made to particular examples embodying the same I wish it to be understood that my invention is not limited to the construction shown in the drawings, and that various changes may be made in the general arrangement of the apparatus and the construction of its parts without departing from the invention.

I claim:

1. An apparatus for measuring liquids, comprising a measuring vessel, a conduit through which the liquid to be measured is delivered under pressure to said vessel, a valve in said conduit, a cylinder, a plunger therein, a spring constantly urging the plunger in one direction, connecting means between said plunger and said valve whereby movement of the plunger by said resilient means actuates said valve, means for diverting the pressure from the conduit to said cylinder to force the plunger in the opposite direction when the liquid reaches a predetermined level in said vessel, and means operative at the end of the plunger stroke in said opposite direction to relieve the plunger of the pressure of the liquid.

2. An apparatus for measuring liquids, comprising a measuring vessel, a conduit through which the liquid to be measured is delivered under pressure to said vessel, a valve in said conduit, a cylinder, a plunger therein, connecting means between said plunger and said valve whereby movement of the plunger in one direction actuates said valve, resilient means constantly urging the plunger in said direction, said cylinder having a connection with said conduit, means for increasing the pressure in the latter connection to force the plunger in the opposite direction, when the liquid reaches a predetermined level in said vessel and means operative at the end of the plunger stroke in said opposite direction to relieve the plunger of the pressure of the liquid.

3. An apparatus for measuring liquids, comprising a measuring vessel, a conduit through which the liquid to be measured is deliverd under pressure to said vessel, a rotary valve in said conduit, a cylinder, a plunger therein, operating mechanism for said valve adapted to be actuated by movement of said plunger in one direction, yielding means urging the plunger in said direction, said cylinder having a connection with said conduit, means for increasing the pressure in the latter connection when a predetermined quantity of liquid has passed through said rotary valve whereby liquid under pressure is supplied to said cylinder to force the plunger in the opposite direction and thereby store energy in said yielding means, and valve means operative at the end of the plunger stroke in said opposite direction to relieve the plunger of the pressure of the liquid.

4. An apparatus for measuring liquids, comprising a measuring vessel, a conduit through which the liquid to be measured is delivered under pressure to said vessel, a rotary valve in said conduit, a cylinder, a plunger therein, operating mechanism for said valve adapted to be actuated by movement of said plunger in one direction, yielding means urging the plunger in said direction, said mechanism being operative to raise the valve from its seat, said cylinder having an outlet and also having an inlet connected to said conduit, means for increasing the pressure in the inlet connection when a predetermined quantity of liquid has passed through said rotary valve whereby liquid under pressure is supplied to said cylinder to force the plunger in the opposite direction and thereby store energy in said yielding means, and valve means operative at the end of the plunger stroke in said opposite direction to open said outlet and close said inlet and thereby relieve the plunger of the pressure of the liquid.

5. An apparatus of the class described, comprising a vessel, a conduit through which liquid is delivered under pressure to said vessel, a valve in said conduit, a cylinder, a plunger therein, operating mechanism for said valve adapted to be actuated by movement of said plunger in one direction, yielding means urging the plunger in said direction, said cylinder having an outlet and also having an inlet connected to said conduit, means for increasing the pressure in the inlet connection when a predetermined quantity of liquid has passed through said rotary valve whereby liquid under pressure is supplied to said cylinder to force the plunger in the opposite direction, a sliding valve adapted to open and close said outlet and inlet, and connecting means between said plunger and said sliding valve whereby movement of the plunger in said one direction actuates the sliding valve to close said outlet and open said inlet.

6. An apparatus of the class described, comprising a vessel, a conduit through which liquid is delivered under pressure to said vessel, a rotary valve in said conduit, a cylinder, a plunger therein, operating mechanism for said valve adapted to be actuated by movement of said plunger in one direction, said mechanism comprising an internally threaded sleeve rotatably mounted in said plunger, means limiting the rotation of said sleeve in one direction while permitting rotation thereof in the other direction, and an externally threaded spindle engaging said sleeve and connected to said valve, yielding means urging the plunger in said direction, said cylinder having an outlet and also having an inlet connected to said conduit, means for increasing the pressure in the inlet connection when a predetermined quantity of liquid has passed through said rotary valve whereby liquid under pressure is supplied to said cylinder to force the plunger in the opposite direction, a sliding valve adapted to open and close said outlet and inlet, and connecting means between the plunger and the sliding valve whereby movement of the plunger in said one direction actuates the sliding valve to close the inlet and open the outlet.

7. An apparatus for measuring liquids, comprising a measuring vessel, a conduit through which the liquid to be measured is delivered under pressure to said vessel, a rotary valve in said conduit, a cylinder, a plunger therein, means preventing rotation of said plunger relative to said cylinder, operating mechanism for said valve adapted to be actuated by movement of said plunger in one direction, said operating mechanism comprising an internally threaded sleeve rotatably mounted in said plunger, mechanism limiting the rotation of said sleeve in one direction while permitting rotation thereof in the other direction, a spindle having projections engaging the threads of said sleeve, and connecting means between said spindle and said valve whereby rotation of the spindle raises the valve from its seat and then rotates it, yielding means urging the plunger in one direction, said cylinder having a connection with said conduit, means in said vessel for increasing the pressure in the latter connection when the liquid reaches a predetermined level in said vessel whereby liquid under pressure is supplied to said cylinder to force the plunger in the opposite direction, and mechanism operated by the plunger for controlling the flow of liquid to and from said cylinder.

In testimony whereof, I hereunto affix my signature.

ERNST HURLBRINK.